(12) United States Patent
Kasai et al.

(10) Patent No.: US 7,577,362 B2
(45) Date of Patent: Aug. 18, 2009

(54) OPTICAL ACCESS NETWORK METHOD, OPTICAL ACCESS NETWORK, AND OPTICAL SWITCH FOR OPTICAL ACCESS NETWORK

(75) Inventors: Hiroyuki Kasai, Tokyo (JP); Toshinori Tsuboi, Tokyo (JP); Hiromi Ueda, Tokyo (JP); Takumi Nomura, Tokyo (JP); Hirokazu Kobayashi, Tokyo (JP); Kunitetsu Makino, Tokyo (JP); Hiroyuki Endo, Tokyo (JP)

(73) Assignee: NEC Communication Systems Ltd., Tokyo (JP)

( * ) Notice: Subject to any disclaimer, the term of this patent is extended or adjusted under 35 U.S.C. 154(b) by 442 days.

(21) Appl. No.: 11/271,817

(22) Filed: Nov. 14, 2005

(65) Prior Publication Data

US 2006/0127087 A1 Jun. 15, 2006

(30) Foreign Application Priority Data

Nov. 12, 2004 (JP) ............................. 2004-329378

(51) Int. Cl.
*H04J 14/00* (2006.01)
(52) U.S. Cl. ............................. 398/70; 398/72; 398/45; 398/49; 398/57; 398/67
(58) Field of Classification Search .................. 398/19, 398/45–50, 56, 57, 66–68, 70, 72
See application file for complete search history.

(56) References Cited

U.S. PATENT DOCUMENTS

| 6,285,473 | B1 * | 9/2001 | Nishi et al. .................... 359/15 |
| 7,283,746 | B2 * | 10/2007 | Ikeda .......................... 398/46 |
| 2004/0208549 | A1 * | 10/2004 | Rutledge et al. .............. 398/50 |

FOREIGN PATENT DOCUMENTS

| JP | 9-153858 A | 6/1997 |
| JP | 10-70509 A | 3/1998 |

* cited by examiner

*Primary Examiner*—Dalzid Singh
(74) *Attorney, Agent, or Firm*—Sughrue Mion, PLLC

(57) ABSTRACT

An optical access network method, an optical access network and an optical switch for an optical access network, capable of solving all the three problems in the conventional GE-PON: transmission distance problem, security problem and communication interference problem. The optical access network comprises an OLT, a plurality of ONUs and one or more stages of optical switches, which are connected one another. In the direction from the OLT to the ONU, each frame (packet) transmitted from the OLT to one of the ONUs is checked so that only the destination ONU specified in the frame (packet) is connected to the OLT. In the direction from the ONU to the OLT, a control message transmitted from the OLT to one of the ONUs is checked so that only one ONU which has been given a transmission allowance from the OLT is connected to the OLT with respect to each frame (packet).

24 Claims, 6 Drawing Sheets

OPTICAL ACCESS NETWORK METHOD, OPTICAL ACCESS NETWORK, AND OPTICAL SWITCH FOR OPTICAL ACCESS NETWORK

FIELD OF THE INVENTION

The present invention relates to an optical access network, and more particularly, to an optical access network method, an optical access network and an optical switch for an optical access network for solving problems of a PON (Passive Optical Network).

BACKGROUND OF THE INVENTION

As a typical conventional technique concerning an optical access network may be cited PON (Passive Optical Network) defined by IEEE 802. 3ah "Draft Amendment to Carrier Sense Multiple Access with Collision Detection (CSMA/CD) access method and physical layer specifications", Oct. 7, 2003: a standard of IEEE (Institute of Electrical and Electronics Engineers). The PON transmits a frame defined by IEEE802. 3ah (hereinafter referred to as an IEEE 802. 3ah frame) or an Ethernet (registered trademark) frame at a gigabit rate. The conventional technique will be herein referred to as a GE-PON.

According to IEEE 802. 3ah, the GE-PON comprises an OLT (Optical Line Terminal) as a center terminal, ONUs (Optical Network Units) as remote terminals, an optical splitter, and optical fibers for connecting them. Generally, the OLT is placed in an office of a carrier, while the ONU is placed in user's home.

Figure 1:
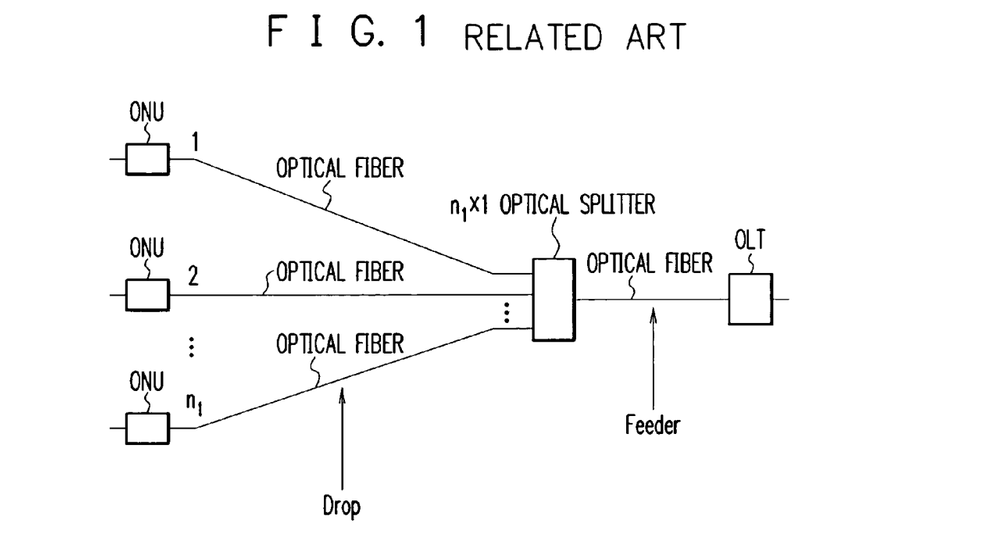
FIG. 1 is a diagram schematically showing an example of the construction of a conventional GE-PON.

FIG. 1 is a diagram schematically showing an example of the construction of the GE-PON. In FIG. 1, an $n_1 \times 1$ optical splitter is employed as the optical splitter. Incidentally, $n_1 \times 1$ indicates that the splitter is provided with one input (output) port and $n_1$ ($n_1$: an integer; $n_1 = 1, 2, 3, \ldots, n$) output (input) port(s). Each port serves as an input port or an output port according the destination of a signal, i.e. according to whether a signal is transmitted to the 1 side or the $n_1$ side. Accordingly, two sides of the optical splitter or the optical switch will not be herein referred to as input/output sides, but referred to as 1 side and $n_1$ side. In addition, a signal transmitted from the OLT to the ONU will be referred to as a downlink signal, while a signal transmitted from the ONU to the OLT will be referred to as an uplink signal.

The OLT is connected via a single optical fiber to the 1 side of the optical splitter. The ONUs are each connected via a single optical fiber to the $n_1$ side of the optical splitter. Incidentally, the optical splitter used herein is a passive device, and therefore, such a system is generally called PON (Passive Optical Network).

In the GE-PON, the direction from the OLT to the ONU is defined as the downlink direction, and light with a wavelength of 1.5 μm is utilized. On the other hand, the direction from the ONU to the OLT is defined as the uplink direction, and light with a wavelength of 1.3 μm is utilized. With a single optical fiber, both-way or two-way communication is performed according to the WDM (Wavelength Division Multiplexing) system. The section between the OLT and the optical splitter is referred to as Feeder section, while the section between the optical splitter and each ONU is referred to as Drop section.

Figure 2:
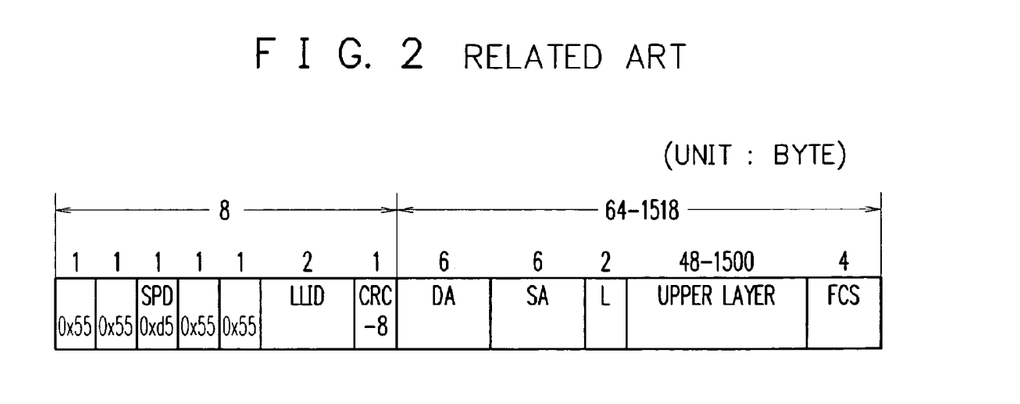
FIG. 2 is a diagram showing the construction of an IEEE 802. 3ah frame.

FIG. 2 is a diagram showing the construction of an IEEE 802. 3ah frame. The IEEE 802. 3ah frame as shown in FIG. 2 is used for a signal (packet) communicated between the OLT and the ONU. In the direction from the OLT to the ONU (downlink direction), an IEEE 802. 3ah frame transmitted from the OLT is split as an optical signal by the optical splitter, and arrives at all the ONUs connected to the optical splitter.

Figure 9:
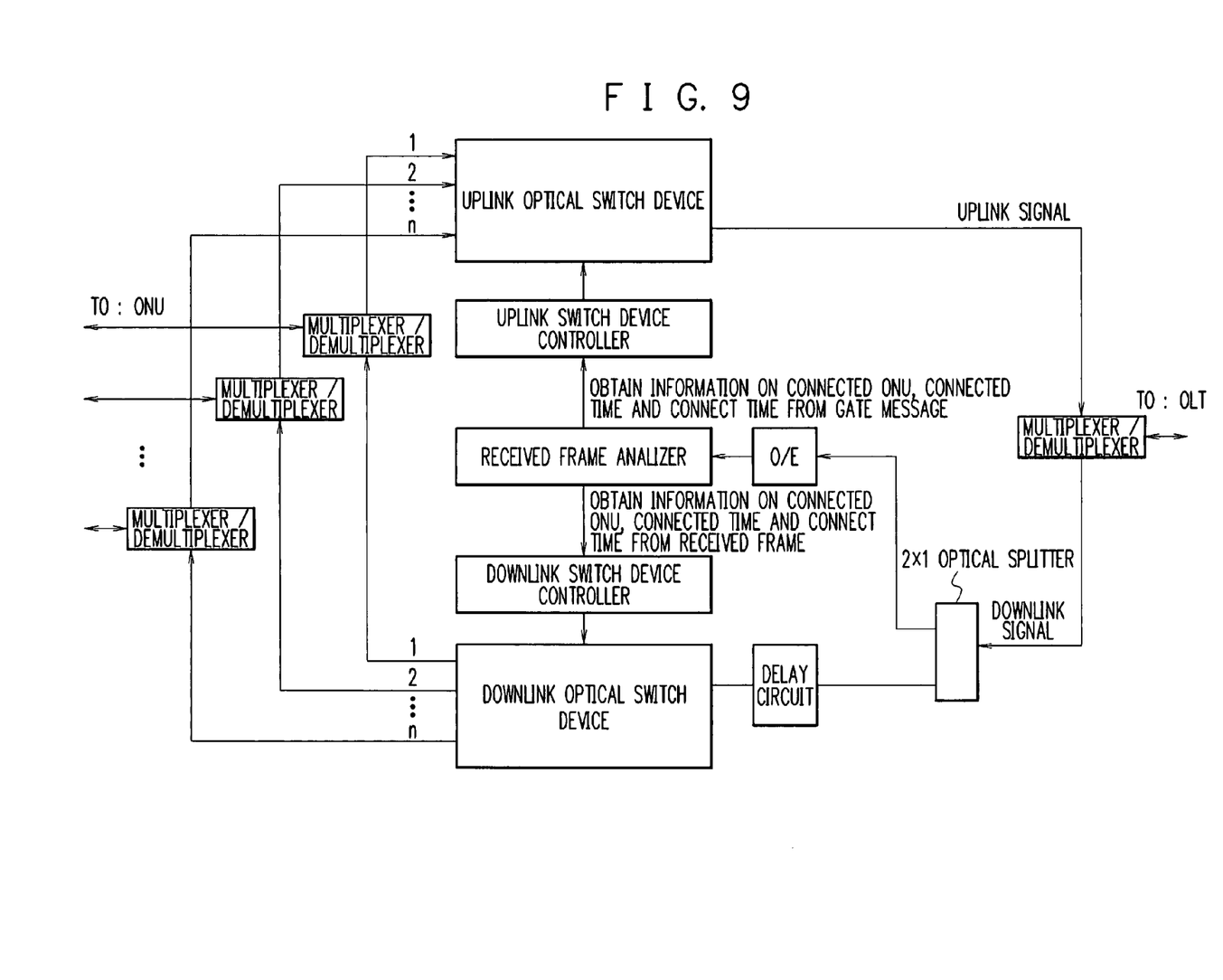
FIG. 9 is a diagram schematically showing the construction of an optical switch for an optical access network according to the present invention.

Each ONU checks the LLID (Logical Link Identifier) of the IEEE 802. 3ah frame shown in FIG. 9 to determine whether or not the frame is directed thereto. When the ONU has determined that the IEEE 802. 3ah frame is directed thereto, it accepts the frame. On the other hand, when the ONU has determined that the IEEE 802. 3ah frame is not directed thereto, it discards the frame.

In the direction from the ONU to the OLT (uplink direction), the OLT performs transmission control for the ONUs connected to the optical splitter so that IEEE 802. 3ah frames transmitted from the respective ONUs do not collide with one another on the optical fiber between the OLT and the optical splitter or in the Feeder section.

More specifically, the OLT instructs each ONU the time at which the IEEE 802. 3ah frame is to be transmitted. The ONU has to transmit the IEEE 802. 3ah frame according to the instruction. Since the OLT performs the transmission control for the respective ONUs, IEEE 802. 3ah frames therefrom do not collide with one another in the Feeder section. Thus, the IEEE 802. 3ah frames can be multiplexed on the time axis and arrive at the OLT.

As is described above, the PON allows a plurality of ONUs to share a network in the Feeder section on the OLT side. In other words, a plurality of ONUs connected to the optical splitter can share one optical fiber and the OLT. Thus, the PON attracts attention in view of the economization of an optical access network.

The GE-PON, however, has three problems as follows.

First, the optical splitter applied to the PON generally divides optical power, which loses signal strength considerably and so provides less transmission distance between the OLT and the ONU. This tendency is especially remarkable when "n" of the n×1 optical splitter is a large value. This loss is the structural one in the optical splitter and an essential characteristic of the device. Therefore, the loss cannot be avoided. In other words, since the optical splitter divides input optical power, in the case of a 2×1 splitter, the optical power is halved, resulting in at least a loss of 3 db. In the case of a 4×1 splitter implemented by two stages of 2×1 splitters, at least a loss of 6 db occurs. In addition, considering the manufacturing loss and the like, the loss is around 8 dB. Similarly, in the case of an 8×1 splitter implemented by three stages of 2×1 splitters, at least a loss of 9 db occurs. In addition, considering the manufacturing loss and the like, the loss is around 11 dB. Further, in the case of a 16×1 splitter implemented by four stages of 2×1 splitters, at least a loss of 12 db occurs. In addition, considering the manufacturing loss and the like, the loss is around 14 dB. Still further, in the case of a 32×1 splitter implemented by five stages of 2×1 splitters, at least a loss of 15 db occurs. In addition, considering the manufacturing loss and the like, the loss is around 17 dB.

The optical splitter loss substantially limits the transmission distance between the OLT and the ONU. With PX-10 defined by IEEE 802. ah as an optical condition, the transmission distance between the OLT and the ONU will be estimated. According to the PX-10 optical condition, a difference in optical power between transmission and reception in the downlink direction is 21 dB. Besides, it is assumed that the sum of connector loss, fusion splice loss, etc. in an optical fiber between the OLT and the ONU is 3 dB, the loss in 1 km of an optical fiber is 0.3 dB and the distribution loss in user's home is 1 dB. Incidentally, the values assumed here are appropriate in a practical optical access network.

In this case, if a 32×1 optical splitter is utilized, (allowable optical fiber loss Lf)=(PX-10 transmission-reception power difference)−(32×1 optical splitter loss)−(the sum of connector loss, fusion splice loss, etc. in an optical fiber)−(distribution loss in user's home)=21−17−3−1=0 dB. Then, the transmission distance D between the OLT and the ONU is 0 km: D=0 km. Besides, if a 16×1 optical splitter is utilized, allowable optical fiber loss Lf=21−14−3−1=3 dB, and the transmission distance D between the OLT and the ONU is 10 km: D=3/0.3=10 km.

As is described above, the optical splitter loss limits the transmission distance between the OLT and the ONU. Additionally, n×1 optical splitter loss increases as the value of "n" becomes larger. An efficient way to operate the PON economically is to increase the value of "n" as possible. However, although PX-10 as an optical condition is applicable to the case where n=16, it cannot be applied to the case where n=32.

Second, the GE-PON has a security problem. As described previously, a downlink signal (IEEE 802.3ah frame) from the OLT is split by the optical splitter, and arrives at all the ONUs connected to the optical splitter. Therefore, a user who has the ONU can view a signal to another user's ONU intentionally or with malice. In the PON, a signal transmitted from the OLT to the ONU is generally encrypted to prevent this. Also, encryption is currently being standardized for the GE-PON. However, even if a signal is encrypted, it would be decrypt, and the security problem cannot be solved.

Third, one ONU can interfere with the communication of another ONU. As described previously, the OLT instructs each ONU the time at which an IEEE 802.3ah frame is to be transmitted, and the ONU transmits the frame at the time so that IEEE 802.3ah frames from the respective ONUs do not collide with one another on the optical fiber between the OLT and the optical splitter or in the Feeder section. That is, the ONU transmits an IEEE 802.3ah frame only at the specified time, and not at the time, terminates the transmission of an optical signal. However, if a user who has the ONU does not follow the instruction intentionally or with malice and continues to transmit optical signals from the ONU, the optical signals are always present in the Feeder section. Consequently, the communication of other ONUs is totally disabled.

Further, even if the user does not continue to transmit optical signals from the ONU intentionally or with malice, when failures occur in the optical transmitter of the ONU and the transmitter continuously transmits optical signals, the same problem arises.

There have been proposed techniques concerning the aforementioned problems in the conventional GE-PON. Japanese Patent Application laid open No. HEI9-153858 discloses a technique to solve the problem that "to avoid the collision of uplink optical signals from a network slave station to a network master station that occurs frequently at an optical star coupler, the arrival of information at the network master station delays".

According to the technique, a plurality of network slave stations are connected to a network master station via star-shaped optical fibers. When one of the network slave stations transmits an optical signal to the network master station, the transmission is detected to connect the optical fiber of the slave station to the master station.

That is, the network of the master and slave stations is configured with a 1×n optical star coupler and a multiposition optical switch. A decoding circuit (address determination circuit) specifies the originating network slave station to energize the switch coil of the multiposition optical switch. Thereby, the network master station is connected to the network slave station and disconnected from the other slave stations. Thus, the collision of uplink optical signals is prevented.

The network may be configured with an optical rotary switch in place of the optical star coupler and the multiposition optical switch. In this case, the decoding circuit discriminates the identification signals of the originating network slave stations fed from a driver circuit. According to the output of the decoding circuit, the optical rotary switch is switched to implement the connection of only necessary circuits.

However, the technique employs the optical star coupler, and therefore, the problem as to the transmission distance is still unsolved. Besides, with the construction using the optical rotary switch, it is possible to avoid the collision of uplink optical signals in the Feeder section. The optical rotary switch, however, neither selects the destination of a downlink optical signal nor connects the signal to the destination.

In addition, Japanese Patent Application laid open No. HEI10-70509 discloses a technique to solve the problem in the three types of conventional optical subscriber line systems: SS (Single Star) system, ADS (Active Double Star) system and PDS (Passive Double Star) system. The SS system has a problem of high cost, the ADS system has a problem of a limitation on provided services, and the PDS system has a security problem.

According to the technique, to solve the problems mentioned above, a time slot controller assigns a time slot to the line terminating equipment CT of an exchange for each subscriber based on the ADS system. The CT and network terminating equipment ONU in each subscriber's home are provided with multi-rate burst converters for inserting/extracting fast or slow information to/from this time slot. Further, a remote terminal RT located between the CT and ONU is provided with a space-division optical switch for switching the time slot as an optical signal.

That is, the optical subscriber line system is configured with a space-division optical switch, and has a time slot structure. With the time slot structure, the space-division optical switch is controlled to ensure the connection to only necessary subscribers.

This technique solves the problems of security and communication interference. However, the time slot structure complicates the system construction. Additionally, since it is not clear whether or not subscribers can be increased by multistage space-division optical switches, the problem as to the transmission distance is probably unsolved.

SUMMARY OF THE INVENTION

It is therefore an object of the present invention to provide an optical access network method, an optical access network and an optical switch for an economical optical access network useful for broadband services, capable of solving all the three problems in the conventional GE-PON: (1) when there are a large number of ONUs (users), long transmission distance cannot be provided; (2) even if a transmitted signal is encrypted, the security problem still arises; and (3) one ONU can interfere with the communication of another ONU intentionally or with malice.

In accordance with the first aspect of the present invention, to achieve the object mentioned above, there is provided an optical access network method wherein a center terminal, a plurality of remote terminals, and one or more optical switches are formed in a hierarchical (tree) structure. The optical switch forwards a downlink signal transmitted from the center terminal to one of the remote terminals specified by the center terminal based on information from the downlink signal, and forwards an uplink signal transmitted from the remote terminal specified by the center terminal to the center terminal based on the information from the downlink signal.

That is, an optical access network has a tree structure with one or more optical switches. The optical switch transmits a signal to only one remote terminal based on information from the center terminal, or transmits a signal from one remote terminal to the center terminal. Thus, it is possible to configure an economical optical access network useful for broadband services, capable of solving all the three problems in the conventional GE-PON: (1) when there are a large number of ONUs (users), long transmission distance cannot be provided; (2) even if a transmitted signal is encrypted, the security problem still arises; and (3) one ONU can interfere with the communication of another ONU intentionally or with malice.

In accordance with the second aspect of the present invention, there is provided an optical access network method comprising the steps of setting one $n_1 \times 1$ optical switch ($n_1$: an integer) as the first optical switch from a center terminal, setting at most $n_1$ pieces of $n_2 \times 1$ optical switches ($n_2$: an integer) as the second optical switches from the center terminal, setting at most $n_1 \cdot n_2$ pieces of $n_3 \times 1$ optical switches ($n_3$: an integer) as the third optical switches from the center terminal, setting at most $n_1 \cdot n_2 \cdot n_3 \ldots n_{k-1}$ pieces of $n_k \times 1$ optical switches ($n_k$: an integer) as the kth optical switches from the center terminal, setting at most $n_1 \cdot n_2 \cdot n_3 \ldots n_k \ldots n_{s-1}$ pieces of $n_s \times 1$ optical switches ($n_s$: an integer, $k \leq s$) as the last (farthest) optical switches from the center terminal, connecting the center terminal to the 1 side of the first $n_1 \times 1$ optical switch through an optical fiber, connecting the $n_1$ side of the first $n_1 \times 1$ optical switch to remote terminals or the 1 sides of the second $n_2 \times 1$ optical switches through optical fibers, connecting the $n_2$ side of the second $n_2 \times 1$ optical switch to remote terminals or the 1 sides of the third $n_3 \times 1$ optical switches through optical fibers, connecting the 1 side of the kth $n_k \times 1$ optical switch to the $n_{k-1}$ side of the (k−1)th $n_{k-1} \times 1$ optical switch from the center terminal through an optical fiber, connecting the $n_k$ side of the kth $n_k \times 1$ optical switch to remote terminals or the 1 sides of the (k+1)th $n_{k+1} \times 1$ optical switches from the center terminal through optical fibers, connecting the 1 side of the sth $n_s \times 1$ optical switch to the $n_{s-1}$ side of the (s−1)th $n_{s-1} \times 1$ optical switch from the center terminal through an optical fiber, connecting the $n_s$ side of the sth $n_s \times 1$ optical switch to remote terminals. The $n_i \times 1$ optical switch (i=1, 2, 3, . . . , k, . . . s) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

By virtue of this construction, the optical access network can be economical as well as useful for broadband services. Also, the optical access network is capable of solving all the three problems in the conventional GE-PON: (1) when there are a large number of ONUs (users), long transmission distance cannot be provided; (2) even if a transmitted signal is encrypted, the security problem still arises; and (3) one ONU can interfere with the communication of another ONU intentionally or with malice.

In accordance with the third aspect of the present invention, in the optical access network method of the first or the second aspect, at most $n_1 \cdot n_2 \cdot n_3 \ldots n_{m-1}$ pieces of $n_m \times 1$ optical switches (nm: an integer, $1 \leq m \leq s$) in the mth stage of the tree structure or the mth position from the center terminal are replaced by $n_m \times 1$ optical splitters.

If the optical switch is expensive, optical switches in a prescribed stage may be replaced by optical splitters. In this case, an optical access network can be configured at low cost. When optical switches in the last stage (the stage closest to remote terminals) are replaced, the second and third problems (security and communication interference problems) in the conventional GE-PON are unsolved. However, it is possible to solve the first problem of the transmission distance.

In accordance with the fourth aspect of the present invention, in the optical access network method of the first or the second aspect, the tree structure consists of 1 stage or "s" indicating the last (farthest) position of the optical switch from the center terminal is 1, and one $n_1 \times 1$ optical switch ($n_1$: an integer) is provided. The 1 side of the $n_1 \times 1$ optical switch is connected through an optical fiber to the center terminal, and the $n_1$ side of the $n_1 \times 1$ optical switch is connected through optical fibers to at most $n_1$ pieces of remote terminals. The $n_1 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

Even in such a simple tree structure with a single stage, one optical fiber can accommodate a large number of ONUs. In addition, it is possible to configure an optical access network capable of solving the three problems in the conventional GE-PON.

In accordance with the fifth aspect of the present invention, in the optical access network method of the first or the second aspect, the tree structure consists of 2 stages, or "s" indicating the last position of the optical switch from the center terminal is 2. One $n_1 \times 1$ optical switch ($n_1$: an integer) is provided as the first optical switch from the center terminal, and at most $n_1$ pieces of $n_2 \times 1$ optical switches ($n_2$: an integer) are provided as the second optical switches from the center terminal. The 1 side of the first $n_1 \times 1$ optical switch is connected through an optical fiber to the center terminal, the $n_1$ side of the first $n_1 \times 1$ optical switch is connected through optical fibers to remote terminals or the 1 sides of the second $n_2 \times 1$ optical switches, and the $n_2$ sides of the second $n_2 \times 1$ optical switches are connected through optical fibers to at most $n_1 \cdot n_2$ pieces of remote terminals. The $n_i \times 1$ optical switch (i=1, 2) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

With a two-stage tree structure, one optical fiber can accommodate a larger number of ONUs as compared to a single-stage tree structure. In addition, it is possible to configure an optical access network capable of solving the three problems in the conventional GE-PON.

In accordance with the sixth aspect of the present invention, in the optical access network method of the first or the second aspect, the tree structure consists of 2 stages, or "s" indicating the last position of the optical switch from the center terminal is 2. One $n_1 \times 1$ optical splitter ($n_1$: an integer) is provided in place of the first optical switch from the center terminal, and at most $n_1$ pieces of $n_2 \times 1$ optical switches ($n_2$: an integer) are provided as the second optical switches from the center terminal. The 1 side of the first $n_1 \times 1$ optical splitter is connected through an optical fiber to the center terminal, the $n_1$ side of the first $n_1 \times 1$ optical splitter is connected through optical fibers to remote terminals or the 1 sides of the second $n_2 \times 1$ optical switches, and the $n_2$ sides of the second $n_2 \times 1$ optical switches are connected through optical fibers to at most $n_1 \cdot n_2$ pieces of remote terminals. The $n_2 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

Even if an optical access network has such a simple two-stage tree structure and employs an optical splitter in place of the optical switch on the OLT side, it is possible to solve the three problems in the conventional GE-PON. Moreover, since the optical switch is replaced by an optical splitter, the entire optical access network can be configured at low cost.

In accordance with the seventh aspect of the present invention, in the optical access network method of the first or the second aspect, the tree structure consists of 2 stages, or "s" indicating the last position of the optical switch from the center terminal is 2. One $n_1 \times 1$ optical switch ($n_1$: an integer) is provided as the first optical switch from the center terminal, and at most $n_1$ pieces of $n_2 \times 1$ optical splitters ($n_2$: an integer) are provided in place of the second optical switches from the center terminal. The 1 side of the first $n_1 \times 1$ optical splitter is connected through an optical fiber to the center terminal, the $n_1$ side of the first $n_1 \times 1$ optical splitter is connected through optical fibers to remote terminals or the 1 sides of the second $n_2 \times 1$ optical splitters, and the $n_2$ sides of the second $n_2 \times 1$ optical splitters are connected through optical fibers to at most $n_1 \cdot n_2$ pieces of remote terminals. The $n_1 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

If an optical access network has a two-stage tree structure and employs optical splitters in place of the optical switches on the ONU side, the second and third problems (security and communication interference problems) in the conventional GE-PON is unsolved. However, it is possible to solve the first problem of the transmission distance. Moreover, since the optical switches are replaced by optical splitters, the entire optical access network can be configured at low cost.

In accordance with the eighth aspect of the present invention, in the optical access network method of one of the first to seventh aspects, the information obtained from the downlink signal is an LLID (Logical Link Identifier) and frame length specified in a frame defined by IEEE 802.3ah transmitted from the center terminal to the specific one of the plurality of remote terminals.

Accordingly, the optical switch can forward a downlink signal transmitted from the center terminal to one remote terminal specified by the center terminal based on information from the downlink signal, and forward an uplink signal transmitted from the remote terminal specified by the center terminal to the center terminal based on the information from the downlink signal.

In accordance with the ninth aspect of the present invention, there is provided an optical access network comprising a center terminal, a plurality of remote terminals, and one or more optical switches, which are formed in a hierarchical (tree) structure. The optical switch forwards a downlink signal transmitted from the center terminal to one of the remote terminals specified by the center terminal based on information from the downlink signal, and forwards an uplink signal transmitted from the remote terminal specified by the center terminal to the center terminal based on the information from the downlink signal.

That is, the optical access network has a tree structure with a plurality of optical switches. The optical switch transmits a signal to only one remote terminal based on information from the center terminal, or transmits a signal from one remote terminal to the center terminal. Thus, it is possible to configure an economical optical access network useful for broadband services, capable of solving all the three problems in the conventional GE-PON: (1) when there are a large number of ONUs (users), long transmission distance cannot be provided; (2) even if a transmitted signal is encrypted, the security problem still arises; and (3) one ONU can interfere with the communication of another ONU intentionally or with malice.

In accordance with the tenth aspect of the present invention, there is provided an optical access network comprising one $n_1 \times 1$ optical switch ($n_1$: an integer) as the first optical switch from a center terminal, at most $n_1$ pieces of $n_2 \times 1$ optical switches ($n_2$: an integer) as the second optical switches from the center terminal, at most $n_1 \cdot n_2$ pieces of $n_3 \times 1$ optical switches ($n_3$: an integer) as the third optical switches from the center terminal, at most $n_1 \cdot n_2 \cdot n_3 \ldots n_{k-1}$ pieces of $n_k \times 1$ optical switches ($n_k$: an integer) as the kth optical switches from the center terminal, at most $n_1 \cdot n_2 \cdot n_3 \ldots n_k \ldots n_{s-1}$ pieces of $n_s \times 1$ optical switches ($n_s$: an integer, $k \leq s$) as the last optical switches from the center terminal. The center terminal is connected through an optical fiber to the 1 side of the first $n_1 \times 1$ optical switch. The $n_1$ side of the first $n_1 \times 1$ optical switch is connected through optical fibers to remote terminals or the 1 sides of the second $n_2 \times 1$ optical switches. The $n_2$ side of the second $n_2 \times 1$ optical switch is connected through optical fibers to remote terminals or the 1 sides of the third $n_3 \times 1$ optical switches. The 1 side of the kth $n_k \times 1$ optical switch is connected through an optical fiber to the $n_{k-1}$ side of the (k−1)th $n_{k-1} \times 1$ optical switch from the center terminal. The $n_k$ side of the kth $n_k \times 1$ optical switch is connected through optical fibers to remote terminals or the 1 sides of the (k+1)th $n_{k+1} \times 1$ optical switches from the center terminal. The 1 side of the sth $n_s \times 1$ optical switch is connected through an optical fiber to the $n_{s-1}$ side of the (s−1)th $n_{s-1} \times 1$ optical switch from the center terminal. The $n_s$ side of the sth $n_s \times 1$ optical switch is connected to remote terminals. The $n_i \times 1$ optical switch (i=1, 2, 3, ..., k, ... s) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

By virtue of this construction, the optical access network can be economical as well as useful for broadband services. Also, the optical access network is capable of solving all the three problems in the conventional GE-PON: (1) when there are a large number of ONUs (users), long transmission distance cannot be provided; (2) even if a transmitted signal is encrypted, the security problem still arises; and (3) one ONU can interfere with the communication of another ONU intentionally or with malice.

In accordance with the eleventh aspect of the present invention, in the optical access network of the ninth or the tenth aspect, at most $n_1 \cdot n_2 \cdot n_3 \ldots n_{m-1}$ pieces of $n_m \times 1$ optical switches (nm: an integer, $1 \leq m \leq s$) in the mth stage of the tree structure or the mth position from the center terminal are replaced by $n_m \times 1$ optical splitters.

If the optical switch is expensive, optical switches in a prescribed stage may be replaced by optical splitters. In this case, an optical access network can be configured at low cost. When optical switches in the last stage (the stage closest to remote terminals) are replaced, the second and third problems (security and communication interference problems) in the conventional GE-PON are unsolved. However, it is possible to solve the first problem of the transmission distance.

In accordance with the twelfth aspect of the present invention, there is provided an optical switch for an optical access network comprising at least a received frame analyzer for analyzing a downlink signal from a center terminal, an uplink optical switch device and a downlink optical switch device. Based on the analysis result obtained by the received frame analyzer, the uplink and downlink optical switch devices perform switching per packet.

The received frame analyzer analyzes a received frame, and can be configured with a general-purpose electric circuit. As the optical switch device may be used, for example, a waveguide switch of ferroelectrics ($LiNbO_3$). In the waveguide switch, an X-shaped waveguide is formed in $LiNbO_3$. Application of a voltage, current or SAW (Surface Acoustic Wave) to the intersection of the waveguide causes local changes in the refractive index, and a signal which has passed through is reflected so that the output direction is switched. If the waveguide switches are configured in a multistage fabric, distribution number can be increased to 2, 4, 8, ..., 32. Additionally, the optical switch device may be formed of a semiconductor substrate, a glass substrate or the like.

By virtue of this construction, the optical switch can forward a downlink signal transmitted from the center terminal to one remote terminal specified by the center terminal based on information from the downlink signal, and forward an uplink signal transmitted from the remote terminal specified by the center terminal to the center terminal based on the information from the downlink signal.

In accordance with the thirteenth aspect of the present invention, in the optical switch for an optical access network of the twelfth aspect, the downlink signal from the center terminal is split into two optical signals by a 2×1 optical splitter, one of which is converted to an electrical signal to be input to the received frame analyzer, and the other is given a prescribed delay by a delay circuit to be input to the downlink optical switch device.

By virtue of this construction, the optical switch can forward a downlink signal transmitted from the center terminal to one remote terminal specified by the center terminal based on information from the downlink signal, and forward an uplink signal transmitted from the remote terminal specified by the center terminal to the center terminal based on the information from the downlink signal.

In accordance with the fourteenth aspect of the present invention, in the optical switch for an optical access network of the twelfth or thirteenth aspect, the downlink signal transmitted from the center terminal and analyzed by the received frame analyzer is a signal of a frame format defined by IEEE 802. 3ah. The downlink optical switch device performs switching based on an LLID (Logical Link Identifier) and frame length specified in the frame. The uplink optical switch device performs switching based on a control message from the center terminal.

By virtue of this construction, the optical switch can forward a downlink signal transmitted from the center terminal to one remote terminal specified by the center terminal based on information from the downlink signal, and forward an uplink signal transmitted from the remote terminal specified by the center terminal to the center terminal based on the information from the downlink signal.

As is described above, in accordance with the present invention, the optical switch automatically operates based on only a frame transmitted from the OLT (center terminal) to the ONU (remote terminal). The optical switch selects one ONU designated by the OLT as a destination or a receiver with respect to each packet (frame) to connect the packet thereto. Thereby, the packet (frame) arrives only at the designated ONU, and does not arrive at the other ONU. Thus, it is possible to achieve excellent effects as follows:

(1) Long transmission distance can be provided between the OLT and the ONU, and signals from a large number of ONUs (users) can be multiplexed in an optical fiber, resulting in an economical optical access network (2) Security in the downlink direction can be ensured (3) Communication interference due to the continuous transmission of optical signals from an ONU does not occur in the uplink direction

BRIEF DESCRIPTION OF THE DRAWINGS

The exemplary aspects and features of the present invention will become more apparent from the consideration of the following detailed description taken in conjunction with the accompanying drawings in which.

DESCRIPTION OF THE PREFERRED EMBODIMENTS

Referring now to the drawings, a description of preferred embodiments of the present invention will be given in detail.

First Embodiment

Figure 3:
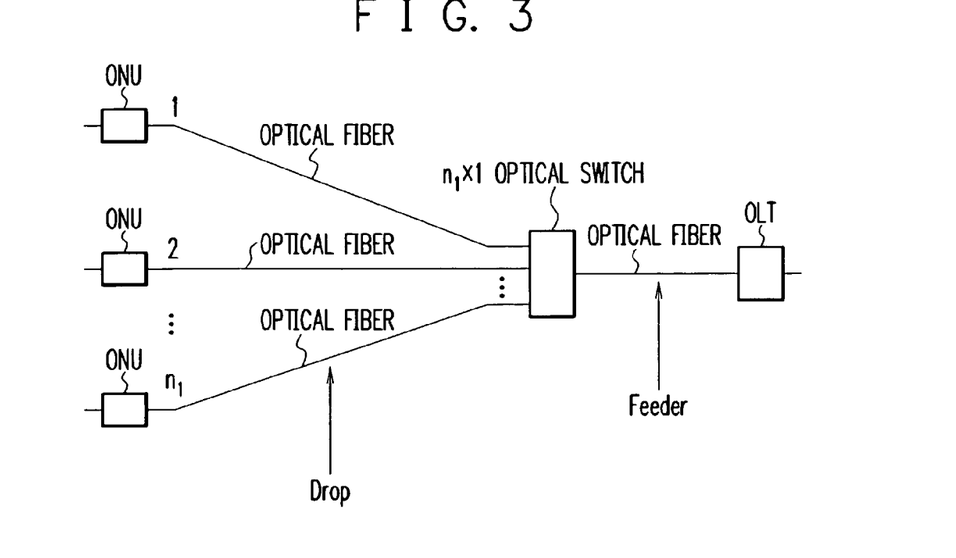
FIG. 3 is a diagram schematically showing the construction of an optical access network according to the first embodiment of the present invention.

FIG. 3 is a diagram schematically showing the construction of an optical access network according to the first embodiment of the present invention. Referring to FIG. 3, the optical access network comprises an OLT (Optical Line Terminal), an $n_1 \times 1$ optical switch, and a plurality of ONUs (Optical Network Units). The 1 side of the $n_1 \times 1$ optical switch is connected through an optical fiber to the OLT. The $n_1$ side of the $n_1 \times 1$ optical switch is connected through optical fibers to the ONUs. Based on a frame transmitted from the OLT to one of the ONUs, the optical switch automatically selects one ONU to connect it to the OLT with respect to uplink and downlink directions.

In other words, the optical switch connects a downlink frame only to the destination ONU of the frame, and not connects the frame to the other ONUs. Besides, the optical switch connects only the ONU that is arrowed to transmit an uplink frame to the OLT. To operate in the above manner, the optical switch may be provided with a received packet analyzer for checking an LLID (Logical Link Identifier) specified in an IEEE 802. 3ah frame.

According to the first embodiment of the present invention, all the three problems in the conventional technique can be solved. The optical switch causes less loss as compared to an optical splitter. Consequently, long transmission distance can be provided between the OLT and the ONU. Even if the value of "n" of the $n_1 \times 1$ optical switch increases, the loss does not much depend on the value of "n".

The transmission distance between the OLT and the ONU will be estimated based on the following assumptions. The loss of a 32×1 optical switch is 8 dB (as will be described later, the optical switch of the present invention includes a built-in 2×1 optical splitter; the loss of the optical splitter is 4 dB and that of only the optical switch is 4 dB). With regard to other related losses, the sum of connector loss, fusion splice loss, etc. in an optical fiber between the OLT and the ONU is 3 dB, the loss in 1 km of an optical fiber is 0.3 dB, and the distribution loss in user's home is 1 dB.

In this case, (allowable optical fiber loss Lf)=(PX-10 transmission-reception power difference)−(32×1 optical switch loss)−(the sum of connector loss, fusion splice loss, etc. in an optical fiber)−(distribution loss in user's home)=21−8−3−1=9 dB. Then, the transmission distance D between the OLT and the ONU is 30 km: D=9/0.3=30 km.

That is, in the case where a 32×1 optical splitter is used in the conventional GE-PON to accommodate at most 32 ONUs, the transmission distance between the OLT and the ONU is 0 km. On the other hand, in this embodiment, when a 32×1 optical switch is used, the transmission distance between the OLT and the ONU is 30 km.

As just described, in this embodiment, even if the number of users increases, the transmission distance between the OLT and the ONU can be increased. Thereby, it is possible to increase the value of "n" indicating the number of signals which can be multiplexed in an optical fiber as compared to the conventional technique. Thus, an economical optical access network can be achieved, and the first problem in the conventional technique is solved.

Besides, on the downlink side of the conventional GE-PON, all ONUs connected to the optical splitter receive the same signal from the OLT. Meanwhile, in this embodiment, the optical switch connects a frame from the OLT only to the destination ONU specified in the frame. In other words, the frame arrives at only the destination ONU specified in the frame, and does not arrive at the other ONUs. Consequently, the second problem or security problem in the conventional technique is solved.

Further, on the uplink side of the conventional GE-PON, the continuous transmission of optical signals from a sending ONU interferes the communication of other ONUs. In this embodiment, however, with respect to the uplink direction, the optical switch also performs switching per frame for each ONU that transmits a frame, and such communication interference does not occur. Therefore, the third problem or communication interference problem in the conventional technique is solved.

As is described above, according to the first embodiment of the present invention, all the three problems in the conventional GE-PON can be solved.

Second Embodiment

Figure 4:
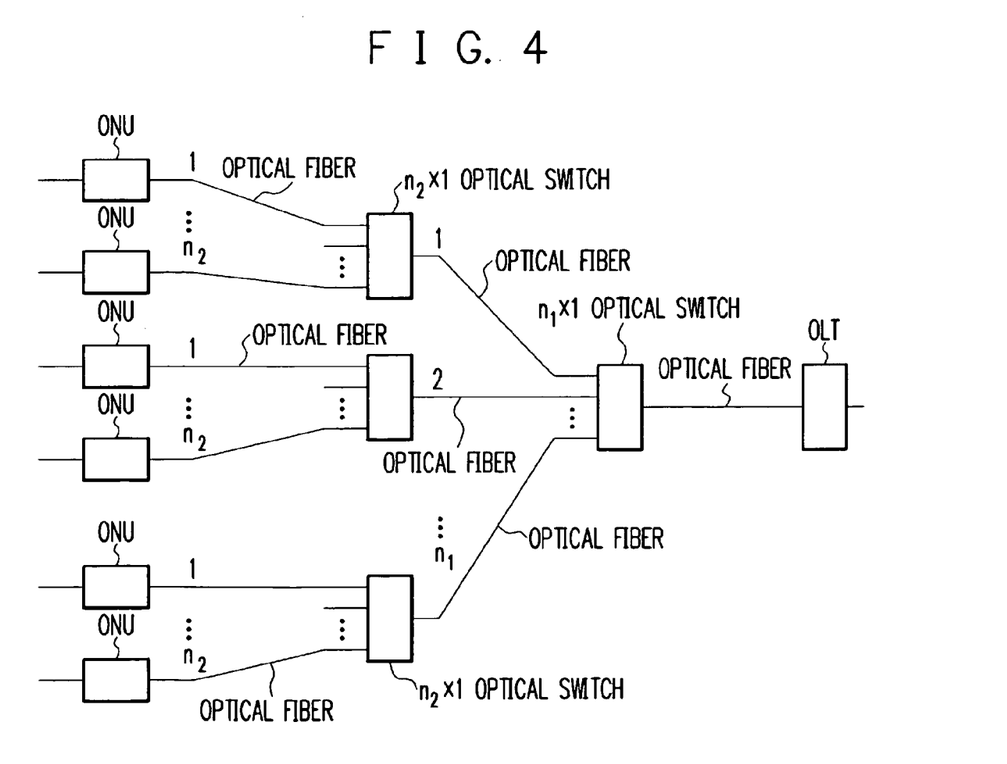
FIG. 4 is a diagram schematically showing the construction of an optical access network according to the second embodiment of the present invention.

FIG. 4 is a diagram schematically showing the construction of an optical access network according to the second embodiment of the present invention. As can be seen in FIG. 4, the optical access network of this embodiment comprises an OLT, two stages of optical switches, and a plurality of ONUs. The OLT is connected through an optical fiber to the optical switch in the first stage. The optical switch in the first stage is connected through optical fibers to the optical switches in the second stage. The optical switches in the second stage are connected through optical fibers to the respective ONUs.

With two stages of relatively small optical switches: $n_1 \times 1$ optical switches with "n" being a small value, a larger optical switch can be implemented. Additionally, one optical fiber can accommodate a larger number of ONUs. In an n×1 optical switch, for example, if n=16, one optical fiber can accommodate 16×16=196 ONUs.

The transmission distance between the OLT and the ONU will be estimated based on the following assumptions. The loss of a 16×1 optical switch is 7 dB (as will be described later, the optical switch of the present invention includes a built-in 2×1 optical splitter; the loss of the optical splitter is 4 dB and that of only the optical switch is 3 dB). With regard to other related losses, the sum of connector loss, fusion splice loss, etc. in an optical fiber between the OLT and the ONU is 3 dB, the loss in 1 km of an optical fiber is 0.3 dB, and the distribution loss in user's home is 1 dB.

In this case, (allowable optical fiber loss Lf)=(PX-10 transmission-reception power difference)−(16×1 optical switch loss×two stages)−(the sum of connector loss, fusion splice loss, etc. in an optical fiber)−(distribution loss in user's home)= 21−7×2−3−1=3 dB. Then, the distance L between the OLT and the ONU is 10 km: L=3/0.3=10 km, which is sufficient for practical use.

That is, in this embodiment, one optical fiber can accommodate at most 196 ONUs within 10 km. In other words, under the same conditions of PX-10 transmission-reception power difference, the sum of connector loss, fusion splice loss, etc. in an optical fiber, and distribution loss in user's home, only 16 ONUs can be accommodated in the conventional GE-PON, while 196 ONUs can be accommodated in this embodiment.

As is described previously, the optical splitter divides optical power, and the loss cannot be structurally reduced. On the other hand, in the case of the optical switch, the loss can be further reduced by manufacturing improvements. If improvements are achieved in manufacturing technique and the loss can be reduced, multistage optical switches can be configured. Thus, it becomes possible to accommodate the larger number of users.

Third Embodiment

Figure 5:
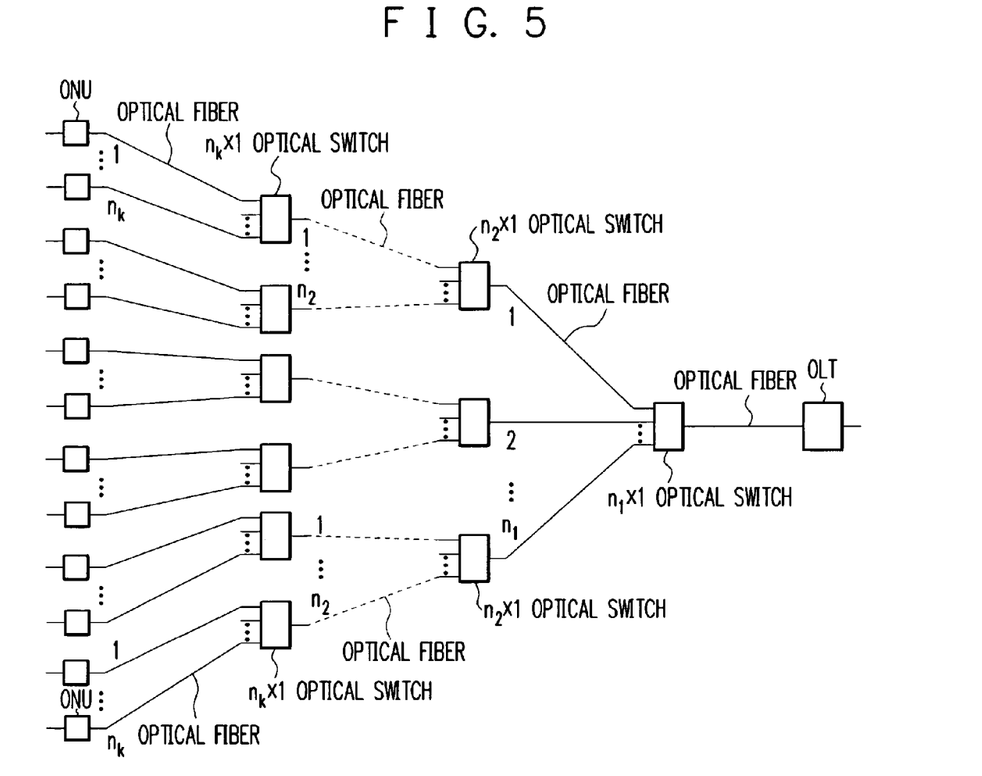
FIG. 5 is a diagram schematically showing the construction of an optical access network according to the third embodiment of the present invention.

FIG. 5 is a diagram schematically showing the construction of an optical access network according to the third embodiment of the present invention. As can be seen in FIG. 5, the optical access network of this embodiment comprises an OLT, multistage optical switches, and a plurality of ONUs.

The OLT and the ONUs are connected through a plurality of optical switches in a hierarchical (tree) structure. While the single-stage optical switch and the two-stage optical switches have been described in the first and second embodiments, respectively, the optical switches in the third embodiment are configured in the arbitrary number of stages. That is, the optical access network may include the arbitrary number of stages of optical switches in consideration of the number of ONUs to be accommodated, the transmission distance between the OLT and the ONU, the loss of each optical switch and the like. With this construction, all the three problems in the conventional technique can be solved.

Fourth Embodiment

Figure 6:
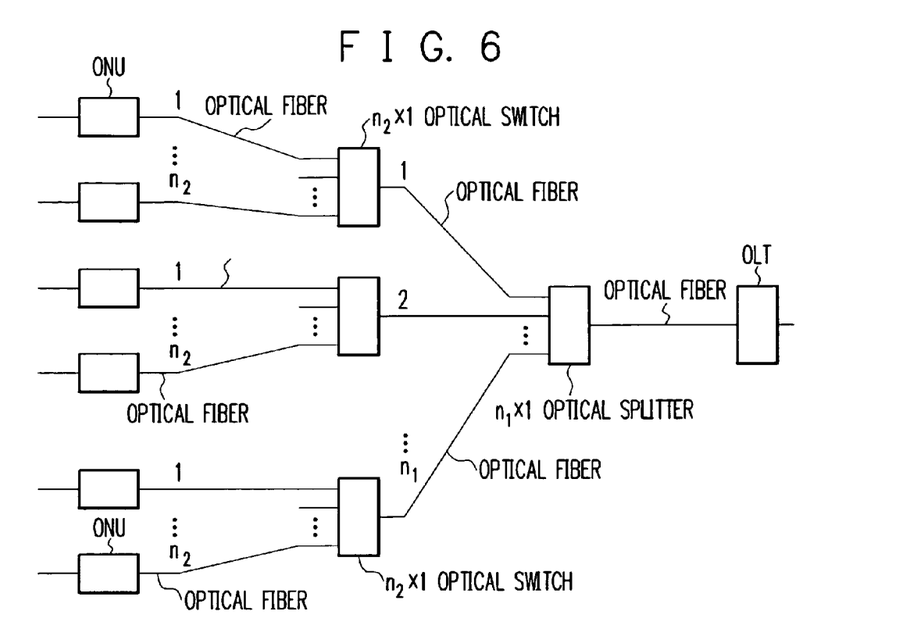
FIG. 6 is a diagram schematically showing the construction of an optical access network according to the fourth embodiment of the present invention.

FIG. 6 is a diagram schematically showing the construction of an optical access network according to the fourth embodiment of the present invention. As can be seen in FIG. 6, the optical access network of this embodiment is basically similar in construction to that of the second embodiment except that the optical switch on the side closer to the OLT is replaced by an optical splitter. More specifically, the optical splitter is arranged on the side closer to the OLT, while the optical switches are arranged on the side closer to the ONUs. The OLT, optical splitter, respective optical switches and ONUs are connected through optical fibers.

In FIG. 6, an $n_1 \times 1$ optical splitter ($n_1$: an integer) is arranged on the side closer to the OLT, while $n_2 \times 1$ optical switches ($n_2$: an integer) are arranged on the side closer to the ONUs. The optical splitter causes loss, even if it is an optical splitter with "$n_1$" being a small value, due to the distribution of optical power. However, the optical switches in the latter stage can increase the number of users and also elongate the transmission distance. That is, the optical access network may include an optical splitter in place of an optical switch in the first stage and optical switches in the second stage in consideration of the number of ONUs to be accommodated, the transmission distance between the OLT and the ONU and the like. With this construction, the first problem in the conventional technique can be solved.

The construction shown in FIG. 6 is advantageous when the optical switch is expensive compared to the optical splitter. In addition, although the optical splitter on the side closer to the OLT arrows a signal (frame) from the OLT to arrive at all the optical switches in the latter stage, the optical switches connect the frame only to one ONU. Thus, the second and third problems (security and communication interference problems) in the conventional technique can also be solved.

Fifth Embodiment

Figure 7:
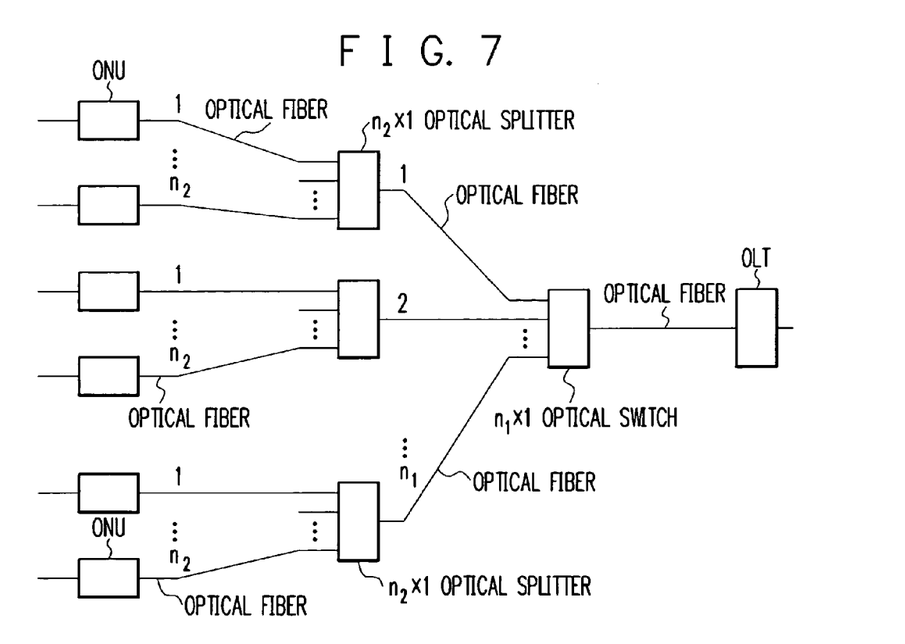
FIG. 7 is a diagram schematically showing the construction of an optical access network according to the fifth embodiment of the present invention.

FIG. 7 is a diagram schematically showing the construction of an optical access network according to the fifth embodiment of the present invention. As can be seen in FIG. 7, the optical access network of this embodiment is basically similar in construction to that of the second embodiment except that the optical switches on the side closer to the ONUs are replaced by optical splitters. More specifically, the optical switch is arranged on the side closer to the OLT, while the optical splitters are arranged on the side closer to the ONUs. The OLT, optical switch, respective optical splitters and ONUs are connected through optical fibers.

Since the optical splitters are arranged on the side closer to the ONUs, the second and third problems in the conventional technique are unsolved. However, with this construction, the first problem or transmission distance problem can be solved. Until the mass-production of optical switches becomes available, the optical splitter is cheaper than the optical switch. Therefore, it is economical to configure the optical access network with optical splitters.

When an $n \times 1$ optical switch is used as the optical switch and $m \times 1$ optical splitters are used as the optical splitters, signals from a total of $n \times m$ ONUs can be multiplexed in an optical fiber. For the time being, the usage of optical splitters is advantageous to configure an optical access network which accommodates a large number of ONUs at low cost.

Sixth Embodiment

Figure 8:
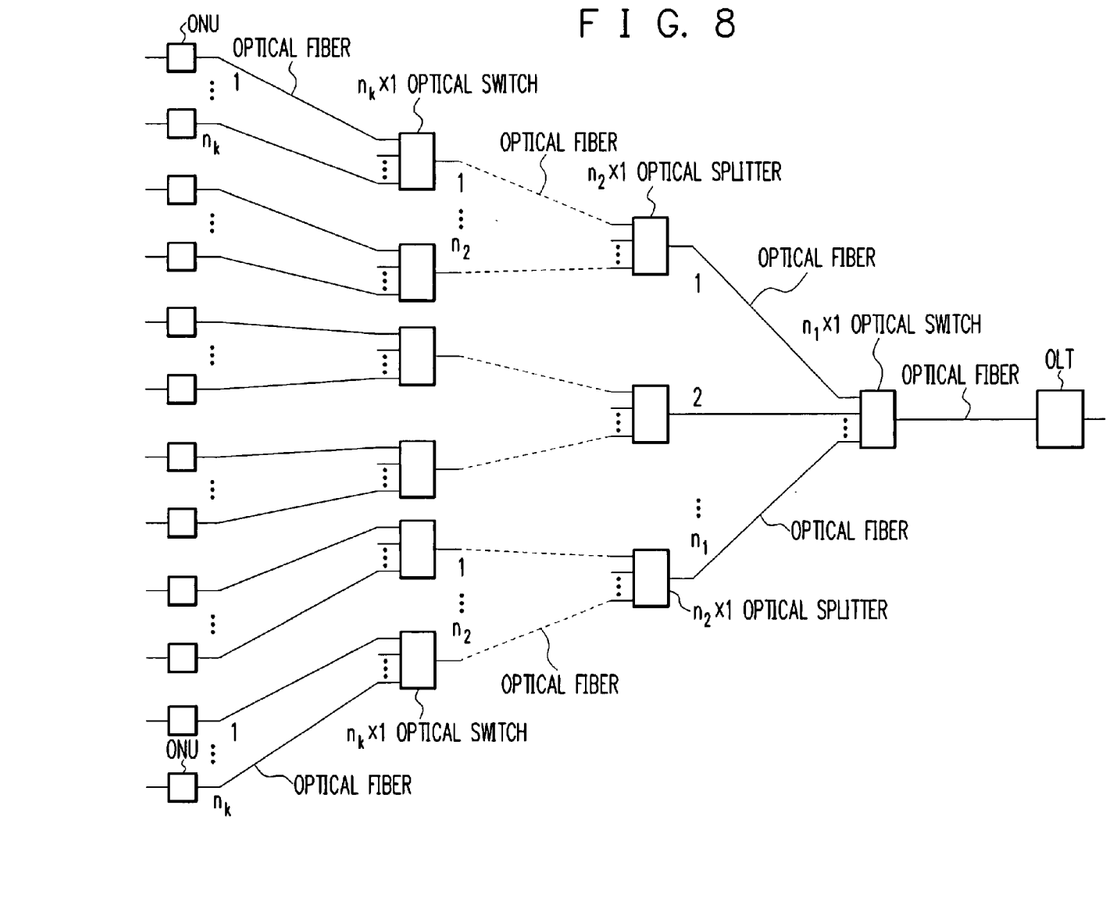
FIG. 8 is a diagram schematically showing the construction of an optical access network according to the sixth embodiment of the present invention.

FIG. 8 is a diagram schematically showing the construction of an optical access network according to the sixth embodiment of the present invention. As can be seen in FIG. 8, the optical access network of this embodiment is basically similar in construction to that of the third embodiment except that the optical switches in the second stage are replaced by optical splitters. Incidentally, in this embodiment, while optical switches in the second stage are replaced, optical switches in any stage may be replaced. That is, the optical access network of this embodiment is equivalent to that of the third embodiment including the arbitrary number of stages of optical switches in consideration of the number of ONUs to be accommodated, the transmission distance between the OLT and the ONU, the loss of each optical switch and the like, in which optical switches in arbitrary stage are replaced by optical splitters.

For example, in the case where the kth optical switches are replaced by optical splitters, as there are at most $n_1 \cdot n_2 \cdot n_3 \ldots n_{k-1}$ pieces of optical switches in the kth stage, all or part of them may be replaced.

If optical switches are connected to the ONUs, i.e., if optical switches are arranged in the last stage, a signal (frame) from the OLT is connected to only one ONU. Thus, all the three problems in the conventional technique can be solved. On the other hand, if optical splitters are connected to the ONUs, the first problem (transmission distance problem) in the conventional can be solved, but the second and third problems (security and communication interference problems) are unsolved. However, for the time being, the usage of optical splitters is advantageous to configure an economical optical access network.

Seventh Embodiment

FIG. 9 is a diagram schematically showing the construction of an optical switch for an optical access network according to the present invention. Incidentally, the construction of the optical switch shown in FIG. 9 is applied to the optical switches of the first to sixth embodiment.

Referring to FIG. 9, the optical switch comprises a plurality of multiplexers/demultiplexers, a 2×1 optical splitter, a delay circuit, an O/E (optical-to-electrical converter), a received frame analyzer, an uplink optical switch device, a downlink optical switch device, an uplink switch device controller, and a downlink switch device controller.

The 2×1 optical splitter splits an optical signal transmitted from the OLT. The delay circuit delays one of the split optical signals to input it to the downlink optical switch device. The signal is electrically delayed by the time necessary to perform the following functions. The O/E receives as input the other optical signal. The O/E converts the downlink signal to an electrical signal, and feeds it to the received frame analyzer.

The received frame (packet) analyzer analyzes the electrical signal. The received frame analyzer checks a destination ONU specified in the received packet (frame) as well as measuring the length thereof. Based on the information, the downlink switch device controller determines a connected ONU (an ONU to which the downlink optical switch device is to be connected), connected time (the time at which the downlink optical switch device is to be connected to the ONU), and connect time (the period during which the downlink optical switch device is connected to the ONU). The downlink switch device controller performs the connection control for the downlink optical switch device with respect to each packet (frame).

In addition, the received frame analyzer analyzes the contents of a control message in a received packet (frame) to determine a destination ONU, the time at which an uplink packet (frame) is to be transmitted, and the time to transmit the packet. Based on the information, the uplink switch device controller determines a connected ONU (an ONU to which the uplink optical switch device is to be connected), connected time (the time at which the uplink optical switch device is to be connected to the ONU), and connect time (the period during which the uplink optical switch device is connected to the ONU). The uplink switch device controller performs the connection control for the uplink optical switch device with respect to each packet (frame).

In other words, the optical switch for an optical access network of the present invention comprises at least a received frame analyzer for analyzing a downlink signal from the center terminal, an uplink optical switch device, and a downlink optical switch device. Based on the analysis result obtained by the received frame analyzer, the uplink and downlink optical switch devices perform switching per packet.

Incidentally, as the optical switch device may be used, for example, a waveguide switch of ferroelectrics ($LiNbO_3$). In the waveguide switch, an X-shaped waveguide is formed. Application of a voltage, current or SAW (Surface Acoustic Wave) to the intersection of the waveguide causes local changes in the refractive index, and a signal which has passed through is reflected so that the output direction is switched. If the waveguide switches are configured in a multistage fabric, distribution number can be increased to 2, 4, 8, . . . , 32. Additionally, the optical switch device may be formed of a semiconductor substrate, a glass substrate or the like.

In the seventh embodiment described above in connection with FIG. 9, if an IEEE 802. 3ah frame shown in FIG. 2 is used, information on a destination ONU necessary for the downlink optical switch device control can be obtained by referring to an LLID specified in the IEEE 802. 3ah frame. Besides, information necessary for the uplink optical switch device control can be obtained by analyzing the contents of a GATE message defined by IEEE 802. 3ah. Based on an obtained LLID, Timestamp, Grant Start, and Grant Length, determinations are made as to a port to which the uplink optical switch device is to be connected, connection start time and connect time. Thereby, the uplink optical switch device can be controlled.

That is, in the optical switch for an optical access network of the present invention, the downlink signal transmitted from the center terminal and analyzed by the received frame analyzer is a signal of a frame format defined by IEEE 802. 3ah. The downlink optical switch device is controlled to perform switching based on an LLID and frame length specified in the frame. The uplink optical switch device is controlled to perform switching based on a control message from the center terminal.

As set forth hereinabove, in accordance with present invention, the optical access network comprises an OLT, a plurality of ONUs and one or more stages of optical switches, which are connected one another. In both the direction from the OLT to the ONU and from the ONU to the OLT, the optical switch operates based on a signal transmitted from the OLT to one of the ONUs. The signal transmitted from the OLT arrives at one ONU specified by the OLT. The ONU specified by the OLT transmits a signal, and the signal arrives at the OLT. By virtue of this construction, the problems in the problems in the conventional GE-PON can be solved. Thus, the optical access network has a wide range of application.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An optical access network method wherein:
   a center terminal, a plurality of remote terminals, and one or more optical switches are formed in a tree structure; and
   the optical switch forwards a downlink signal transmitted from the center terminal to one of the remote terminals specified by the center terminal based on information from the downlink signal, and forwards an uplink signal transmitted from the remote terminal specified by the center terminal to the center terminal based on the information from the downlink signal.

2. The optical access network method claimed in claim 1, wherein at most $n_1 \cdot n_2 \cdot n_3 \ldots n_{m-1}$ pieces of $n_m \times 1$ optical switches (nm: an integer, $1 \leq m \leq s$) in the mth stage of the tree structure or the mth position from the center terminal are replaced by $n_m \times 1$ optical splitters.

3. The optical access network method claimed in claim 1, wherein:
   the tree structure consists of 1 stage or "s" indicating the last position of the optical switch from the center terminal is 1, and one $n_1 \times 1$ optical switch ($n_1$: an integer) is provided;
   the 1 side of the $n_1 \times 1$ optical switch is connected through an optical fiber to the center terminal;
   the $n_1$ side of the $n_1 \times 1$ optical switch is connected through optical fibers to at most $n_1$ pieces of remote terminals; and
   the $n_1 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

4. The optical access network method claimed in claim 1, wherein:
   the tree structure consists of 2 stages, or "s" indicating the last position of the optical switch from the center terminal is 2;
   one $n_1 \times 1$ optical switch ($n_1$: an integer) is provided as the first optical switch from the center terminal;
   at most $n_1$ pieces of $n_2 \times 1$ optical switches ($n_2$: an integer) are provided as the second optical switches from the center terminal;
   the 1 side of the first $n_1 \times 1$ optical switch is connected through an optical fiber to the center terminal;
   the $n_1$ side of the first $n_1 \times 1$ optical switch is connected through optical fibers to remote terminals or the 1 sides of the second $n_2 \times 1$ optical switches;

the $n_2$ sides of the second $n_2 \times 1$ optical switches are connected through optical fibers to at most $n_1 \cdot n_2$ pieces of remote terminals; and the $n_i \times 1$ optical switch (i=1, 2) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

5. The optical access network method claimed in claim 1, wherein:

the tree structure consists of 2 stages, or "s" indicating the last position of the optical switch from the center terminal is 2;

one $n_1 \times 1$ optical splitter ($n_1$: an integer) is provided in place of the first optical switch from the center terminal;

at most $n_1$ pieces of $n_2 \times 1$ optical switches ($n_2$: an integer) are provided as the second optical switches from the center terminal;

the 1 side of the first $n_1 \times 1$ optical splitter is connected through an optical fiber to the center terminal;

the $n_1$ side of the first $n_1 \times 1$ optical splitter is connected through optical fibers to remote terminals or the 1 sides of the second $n_2 \times 1$ optical switches;

the $n_2$ sides of the second $n_2 \times 1$ optical switches are connected through optical fibers to at most $n_1 \cdot n_2$ pieces of remote terminals; and the $n_2 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

6. The optical access network method claimed in claim 1, wherein the tree structure consists of 2 stages, or "s" indicating the last position of the optical switch from the center terminal is 2;

one $n_1 \times 1$ optical switch ($n_1$: an integer) is provided as the first optical switch from the center terminal;

at most $n_1$ pieces of $n_2 \times 1$ optical splitters ($n_2$: an integer) are provided in place of the second optical switches from the center terminal;

the $_1$ side of the first $n_1 \times 1$ optical splitter is connected through an optical fiber to the center terminal;

the $n_1$ side of the first $n_1 \times 1$ optical splitter is connected through optical fibers to remote terminals or the 1 sides of the second $n_2 \times 1$ optical splitters;

the $n_2$ sides of the second $n_2 \times 1$ optical splitters are connected through optical fibers to at most $n_1 \cdot n_2$ pieces of remote terminals; and the $n_1 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

7. The optical access network claimed in claim 1, wherein at most $n_1 \cdot n_2 \cdot n_3 \ldots nm_{-1}$ pieces of $n_m \times 1$ optical switches ($n_m$: an integer, $1 \leq m \leq s$) in the mth stage of the tree structure or the mth position from the center terminal are replaced by $n_m \times 1$ optical splitters.

8. The optical access network method according to claim 1, wherein the optical switch comprises:

a received frame analyzer which analyzes the downlink signal and determines a downlink switching configuration and an uplink switching configuration.

9. The optical access network method according to claim 8, wherein the received frame analyzer determines the downlink switching configuration and the uplink switching configuration per packet.

10. The optical access network method according to claim 8, wherein determining the downlink switching configuration comprises determining at least one of a remote terminal among the plurality of terminal to which the downlink signal is to be forwarded, a connection time corresponding to the time at which the switch is to connected to the remote terminal and the connect time period corresponding to the period of time during which the switch is connected to the remote terminal.

11. The optical access network method according to claim 8, wherein determining the uplink switching configuration comprises determining at least one of a remote terminal among the plurality of terminal to which an uplink packet is to be forwarded, a connection time corresponding to the time at which the switch is to connected to the remote terminal and the connect time period corresponding to the period of time during which the switch is connected to the remote terminal.

12. An optical access network method comprising the steps of:

setting one $n_1 \times 1$ optical switch ($n_1$: an integer) as the first optical switch from a center terminal;

setting at most $n_1$ pieces of $n_2 \times 1$ optical switches ($n_2$: an integer) as the second optical switches from the center terminal;

setting at most $n_1 \cdot n_2$ pieces of $n_3 \times 1$ optical switches ($n_3$: an integer) as the third optical switches from the center terminal;

setting at most $n_1 \cdot n_2 \cdot n_3 \ldots n_{k-1}$ pieces of $n_k \times 1$ optical switches ($n_k$: an integer) as the kth optical switches from the center terminal;

setting at most $n_1 \cdot n_2 \cdot n_3 \ldots n_k \ldots n_{s-1}$ pieces of $n_s \times 1$ optical switches ($n_s$: an integer, $k \leq s$) as the last optical switches from the center terminal;

connecting the center terminal to the 1 side of the first $n_1 \times 1$ optical switch through an optical fiber;

connecting the $n_1$ side of the first $n_1 \times 1$ optical switch to remote terminals or the 1 sides of the second $n_2 \times 1$ optical switches through optical fibers;

connecting the $n_2$ side of the second $n_2 \times 1$ optical switch to remote terminals or the 1 sides of the third $n_3 \times 1$ optical switches through optical fibers;

connecting the 1 side of the kth $n_k \times 1$ optical switch to the $n_{k-1}$ side of the (k−1)th $n_{k-1} \times 1$ optical switch from the center terminal through an optical fiber;

connecting the $n_k$ side of the kth $n_k \times 1$ optical switch to remote terminals or the 1 sides of the (k+1)th $n_{k+1} \times 1$ optical switches from the center terminal through optical fibers;

connecting the 1 side of the sth $n_s \times 1$ optical switch to the $n_{s-1}$ side of the (s−1)th $n_{s-1} \times 1$ optical switch from the center terminal through an optical fiber; and connecting the $n_s$ side of the sth $n_s \times 1$ optical switch to remote terminals;

wherein the $n_i \times 1$ optical switch (i=1, 2, 3, . . . , k, . . . s) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

13. The optical access network method claimed in claim 12, wherein at most $n_1 \cdot n_2 \cdot n_3 \ldots n_{m-1}$ pieces of $n_m \times 1$ optical switches (nm: an integer, $1 \leq m \leq s$) in the mth stage of the tree structure or the mth position from the center terminal are replaced by $n_m \times 1$ optical splitters.

14. The optical access network method claimed in claim 12, wherein:
the tree structure consists of 1 stage or "s" indicating the last position of the optical switch from the center terminal is 1, and one $n_1 \times 1$ optical switch ($n_1$: an integer) is provided;
the 1 side of the $n_1 \times 1$ optical switch is connected through an optical fiber to the center terminal;
the $n_1$ side of the $n_1 \times 1$ optical switch is connected through optical fibers to at most $n_1$ pieces of remote terminals; and
the $n_1 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

15. The optical access network method claimed in claim 12, wherein:
the tree structure consists of 2 stages, or "s" indicating the last position of the optical switch from the center terminal is 2;
one $n_1 \times 1$ optical switch ($n_1$: an integer) is provided as the first optical switch from the center terminal;
at most $n_1$ pieces of $n_2 \times 1$ optical switches ($n_2$: an integer) are provided as the second optical switches from the center terminal;
the 1 side of the first $n_1 \times 1$ optical switch is connected through an optical fiber to the center terminal;
the $n_1$ side of the first $n_1 \times 1$ optical switch is connected through optical fibers to remote terminals or the 1 sides of the second $n_2 \times 1$ optical switches;
the $n_2$ sides of the second $n_2 \times 1$ optical switches are connected through optical fibers to at most $n_1 \cdot n_2$ pieces of remote terminals; and
the $n_i \times 1$ optical switch (i=1, 2) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

16. The optical access network method claimed in claim 12, wherein:
the tree structure consists of 2 stages, or "s" indicating the last position of the optical switch from the center terminal is 2;
one $n_1 \times 1$ optical splitter ($n_1$: an integer) is provided in place of the first optical switch from the center terminal;
at most $n_1$ pieces of $n_2 \times 1$ optical switches ($n_2$: an integer) are provided as the second optical switches from the center terminal;
the 1 side of the first $n_1 \times 1$ optical splitter is connected through an optical fiber to the center terminal;
the $n_1$ side of the first $n_1 \times 1$ optical splitter is connected through optical fibers to remote terminals or the 1 sides of the second $n_2 \times 1$ optical switches;
the $n_2$ sides of the second $n_2 \times 1$ optical switches are connected through optical fibers to at most $n_1 \cdot n_2$ pieces of remote terminals; and
the $n_2 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

17. The optical access network method claimed in claim 12, wherein the tree structure consists of 2 stages, or "s" indicating the last position of the optical switch from the center terminal is 2;
one $n_1 \times 1$ optical switch ($n_1$: an integer) is provided as the first optical switch from the center terminal;
at most $n_1$ pieces of $n_2 \times 1$ optical splitters ($n_2$: an integer) are provided in place of the second optical switches from the center terminal;
the 1 side of the first $n_1 \times 1$ optical splitter is connected through an optical fiber to the center terminal;
the $n_1$ side of the first $n_1 \times 1$ optical splitter is connected through optical fibers to remote terminals or the 1 sides of the second $n_2 \times 1$ optical splitters;
the $n_2$ sides of the second $n_2 \times 1$ optical splitters are connected through optical fibers to at most $n_1 \cdot n_2$ pieces of remote terminals; and
the $n_1 \times 1$ optical switch forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

18. The optical access network method claimed in claim 12, wherein the information obtained from the downlink signal is a logical link identifier and frame length specified in a frame defined by IEEE 802. 3ah transmitted from the center terminal to the specific one of the plurality of remote terminals.

19. The optical access network claimed in claim 12, wherein at most $n_1 \cdot n_2 \cdot n_3 \ldots n_{m-1}$ pieces of $n_m \times 1$ optical switches (nm: an integer, $1 \leq m \leq s$) in the mth stage of the tree structure or the mth position from the center terminal are replaced by $n_m \times 1$ optical splitters.

20. An optical access network comprising a center terminal, a plurality of remote terminals, and one or more optical switches, which are formed in a tree structure, wherein the optical switch forwards a downlink signal transmitted from the center terminal to one of the remote terminals specified by the center terminal based on information from the downlink signal, and forwards an uplink signal transmitted from the remote terminal specified by the center terminal to the center terminal based on the information from the downlink signal.

21. An optical access network comprising:
one $n_1 \times 1$ optical switch ($n_1$: an integer) as the first optical switch from a center terminal;
at most $n_1$ pieces of $n_2 \times 1$ optical switches ($n_2$: an integer) as the second optical switches from the center terminal;
at most $n_1 \cdot n_2$ pieces of $n_3 \times 1$ optical switches ($n_3$: an integer) as the third optical switches from the center terminal;
at most $n_1 \cdot n_2 \cdot n_3 \ldots n_{k-1}$ pieces of $n_k \times 1$ optical switches ($n_k$: an integer) as the kth optical switches from the center terminal;

at most $n_1 \cdot n_2 \cdot n_3 \ldots n_k \ldots n_{s-1}$ pieces of $n_s \times 1$ optical switches ($n_s$: an integer, $k \leqq s$) as the last optical switches from the center terminal; wherein:

the center terminal is connected through an optical fiber to the 1 side of the first $n_1 \times 1$ optical switch;

the $n_1$ side of the first $n_1 \times 1$ optical switch is connected through optical fibers to remote terminals or the 1 sides of the second $n_2 \times 1$ optical switches;

the $n_2$ side of the second $n_2 \times 1$ optical switch is connected through optical fibers to remote terminals or the 1 sides of the third $n_3 \times 1$ optical switches;

the 1 side of the kth $n_k \times 1$ optical switch is connected through an optical fiber to the $n_{k-1}$ side of the (k−1)th $n_{k-1} \times 1$ optical switch from the center terminal;

the $n_k$ side of the kth $n_k \times 1$ optical switch is connected through optical fibers to remote terminals or the 1 sides of the (k+1)th $n_{k+1} \times 1$ optical switches from the center terminal;

the 1 side of the sth $n_s \times 1$ optical switch is connected through an optical fiber to the $n_s \times 1$ side of the (s−1)th $n_{s-1} \times 1$ optical switch from the center terminal;

the $n_s$ side of the sth $n_s \times 1$ optical switch is connected to remote terminals; and the $n_i \times 1$ optical switch (i=1, 2, 3, ..., k, ... s) forwards a downlink signal transmitted from the center terminal to one remote terminal specified by the center terminal based on information from the downlink signal, and forwards an uplink signal transmitted from the remote terminal specified by the center terminal to the center terminal based on the information from the downlink signal.

22. An optical switch for an optical access network comprising, at least:
a received frame analyzer for analyzing a downlink signal from a center terminal;
an uplink optical switch device; and
a downlink optical switch device;
wherein based on the analysis result obtained by the received frame analyzer, the uplink and downlink optical switch devices perform switching per packet.

23. The optical switch for an optical access network claimed in claim 22, wherein the downlink signal from the center terminal is split into two optical signals by a 2×1 optical splitter, one of which is converted to an electrical signal to be input to the received frame analyzer, and the other is given a prescribed delay by a delay circuit to be input to the downlink optical switch device.

24. The optical switch for an optical access network claimed in claim 22, wherein:
the downlink signal transmitted from the center terminal and analyzed by the received frame analyzer is a signal of a frame format defined by IEEE 802. 3ah;
the downlink optical switch device performs switching based on a logical link identifier and frame length specified in the frame; and
the uplink optical switch device performs switching based on a control message from the center terminal.

* * * * *